(12) United States Patent
He et al.

(10) Patent No.: US 10,405,310 B2
(45) Date of Patent: *Sep. 3, 2019

(54) TIME DIVISION DUPLEX (TDD) UPLINK DOWNLINK (UL-DL) RECONFIGURATION

(71) Applicant: INTEL CORPORATION, Santa Clara, CA (US)

(72) Inventors: Hong He, Sunnyvale, CA (US); Alexey Khoryaev, Nizhny Novgorod (RU); Sergey Panteleev, Nizhny Novgorod (RU); Jong-Kae Fwu, Sunnyvale, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/801,126

(22) Filed: Nov. 1, 2017

(65) Prior Publication Data

US 2018/0070356 A1   Mar. 8, 2018

Related U.S. Application Data

(60) Continuation of application No. 15/136,743, filed on Apr. 22, 2016, now Pat. No. 9,844,054, which is a
(Continued)

(51) Int. Cl.
*H04W 72/04* (2009.01)
*H04W 76/10* (2018.01)
(Continued)

(52) U.S. Cl.
CPC ........ *H04W 72/0446* (2013.01); *H04B 7/024* (2013.01); *H04B 7/0452* (2013.01);
(Continued)

(58) Field of Classification Search
CPC ........... H04W 72/0446; H04W 72/042; H04W 72/0413; H04L 5/1469; H04L 5/14; H04J 11/005; H04B 7/024
See application file for complete search history.

(56) References Cited

U.S. PATENT DOCUMENTS

2009/0249153 A1   10/2009   Zhang
2011/0013542 A1   1/2011   Yu et al.
(Continued)

FOREIGN PATENT DOCUMENTS

CN   102255718 A   11/2011
CN   102577522 A   7/2012
(Continued)

OTHER PUBLICATIONS

Catt; "Further study on the performance and backhaul signaling requirements for CCIM"; 3GPP TSG R1-132632; (May 20-24, 2013); 6 pages; RAN WG1 Meeting #73, Fukuoka, Japan; Agenda 6.2.3.1.
(Continued)

*Primary Examiner* — Jamal Javaid
(74) *Attorney, Agent, or Firm* — Thorpe North & Western

(57) ABSTRACT

An eNodeB operable to perform Enhanced Interference Mitigation & Traffic Adaptation (eIMTA) is disclosed. The eNodeB can select a radio network temporary identifier (RNTI) that is used for eIMTA. The eNodeB can determine a periodicity for monitoring a physical downlink control channel (PDCCH) with the RNTI. The eNodeB can determine a set of subframes to monitor the PDCCH with the RNTI within the periodicity. The eNodeB can encode, for transmission to a user equipment (UE), the RNTI, the periodicity for monitoring the PDCCH with the RNTI, and the set of subframes to monitor the PDCCH with the RNTI.

22 Claims, 14 Drawing Sheets

Related U.S. Application Data division of application No. 14/226,264, filed on Mar. 26, 2014, now Pat. No. 9,386,608.

(60) Provisional application No. 61/841,230, filed on Jun. 28, 2013.

(51) Int. Cl.

| | |
|---|---|
| H04W 76/19 | (2018.01) |
| H04W 76/30 | (2018.01) |
| H04B 7/0452 | (2017.01) |
| H04B 7/06 | (2006.01) |
| H04W 56/00 | (2009.01) |
| H04W 72/02 | (2009.01) |
| H04L 25/02 | (2006.01) |
| H04L 25/03 | (2006.01) |
| H04W 88/02 | (2009.01) |
| H04W 16/14 | (2009.01) |
| H04W 8/00 | (2009.01) |
| H04W 48/16 | (2009.01) |
| H04L 12/18 | (2006.01) |
| H04W 74/00 | (2009.01) |
| H04W 74/08 | (2009.01) |
| H04W 36/02 | (2009.01) |
| H04W 68/04 | (2009.01) |
| H04B 7/024 | (2017.01) |
| H04J 11/00 | (2006.01) |
| H04L 5/14 | (2006.01) |
| H04W 24/10 | (2009.01) |
| H04W 84/18 | (2009.01) |
| H04W 88/06 | (2009.01) |
| H04W 84/04 | (2009.01) |
| H04W 48/12 | (2009.01) |

(52) U.S. Cl.
CPC .......... *H04B 7/0626* (2013.01); *H04J 11/005* (2013.01); *H04L 5/1469* (2013.01); *H04L 12/18* (2013.01); *H04L 25/021* (2013.01); *H04L 25/0242* (2013.01); *H04L 25/03891* (2013.01); *H04W 8/005* (2013.01); *H04W 16/14* (2013.01); *H04W 24/10* (2013.01); *H04W 36/02* (2013.01); *H04W 48/16* (2013.01); *H04W 56/0005* (2013.01); *H04W 68/04* (2013.01); *H04W 72/02* (2013.01); *H04W 72/042* (2013.01); *H04W 74/004* (2013.01); *H04W 74/006* (2013.01); *H04W 74/0816* (2013.01); *H04W 76/10* (2018.02); *H04W 76/19* (2018.02); *H04W 76/30* (2018.02); *H04W 88/02* (2013.01); *H04W 48/12* (2013.01); *H04W 72/0406* (2013.01); *H04W 84/045* (2013.01); *H04W 84/18* (2013.01); *H04W 88/06* (2013.01)

(56) References Cited

U.S. PATENT DOCUMENTS

| | | | |
|---|---|---|---|
| 2012/0281625 A1 | 11/2012 | Noh et al. | |
| 2013/0107832 A1 | 5/2013 | Kim et al. | |
| 2014/0198733 A1* | 7/2014 | Yin | H04W 72/0446 370/329 |

FOREIGN PATENT DOCUMENTS

| | | |
|---|---|---|
| CN | 102893684 A | 1/2013 |
| TW | 1341107 | 4/2011 |
| TW | 1362863 | 4/2012 |
| TW | 201220916 A | 5/2012 |
| TW | 1373275 | 9/2012 |
| TW | 1376909 | 11/2012 |
| WO | WO 2011/140378 A2 | 11/2011 |
| WO | WO 2012042041 A1 | 4/2012 |
| WO | WO 2012/065287 A1 | 5/2012 |
| WO | WO 2012/149908 A1 | 11/2012 |
| WO | WO 2012/175030 A1 | 12/2012 |
| WO | WO 2013/007152 A1 | 1/2013 |
| WO | WO 2013/082937 A1 | 6/2013 |

OTHER PUBLICATIONS

Catt; "Interference mitigation schemes for TDD eIMTA"; 3GPP TSG R1-130049; (Jan. 28-Feb. 1, 2013); 4 pages; RAN WG1 Meeting #72, St. Julian's Malta; Agenda 7.3.3.2.
Catt; "Signaling mechanisms for TDD-UL-DL reconfiguration"; 3GPP TSG R1-131882; (May 20-24, 2013); 4 pages; RAN WG1 Meeting #73, Fukuoka, Japan; Agenda 6.2.3.2.
ETSI TR 136 932; "LTE; Scenarios and requirements for small cell enhancements for E-UTRA and E-UTRAN"; (3GPP TR 36.932 version 12.1.0 Release 12); (Oct. 2014); 16 pages; V12.1.0.
LG Electronics; "Backhaul Signaling Support for ICIC in Dynamic TDD UL-DL Reconfigurations"; 3GPP TSG R1-132227; (May 20-24, 2013); 5 pages; RAN WG1 Meeting #73, Fukuoka, Japan; Agenda 6.2.3.1.
Media Tek Inc.; "Signaling Support for TDD eIMTA"; 3GPP TSG R1-132273; (May 20-24, 2013); 5 pages; RAN WG1 Meeting #73, Fukuoka, Japan; Agenda 6.2.3.2.
Nakamura; "LTE Release 12 and Beyond"; 3GPP TSG-RAN; (Jun. 2013); 17 pages; NTT DOCOMO, Africa.
Pantech; "Change of PDCCH subframe due to CCS configuration"; 3GPP TSG R2-124542; (Oct. 8-12, 2012); 7 pages; RAN WG2 Meeting #79bis, Bratislava, Slovakia; Agenda 7.8.
Renesas Mobile Europe Ltd.; "Discussions on interference mitigation schemes for TDD UL-DL reconfiguration"; 3GPP TSG R1-130419; (Jan. 28-Feb. 1, 2013); 5 pages; RAN WG1 Meeting #72, St. Julian's, Malta; Agenda 7.3.3.2.
Sharp; "Common search space in ePDCCH and fallback operation in Rel-11"; 3GPP TSG R1-122390; (May 21-25, 2012); 6 pages; RAN WG1 Meeting #69, Prague, Czech Republic; Agenda 7.6.4.5.
Zte; "Signaling mechanism for TDD UL-DL configuration"; 3GPP TSG R1-132109; (May 20-24, 2013); 3 pages; RAN WG1 Meeting #73, Fukuoka, Japan; Agenda 6.2.3.2.
Catt [RAN WG1]; "[Draft] LS on LTE_TDD_eIMTA"; 3GPP TSG R1-134981; (Oct. 7-11, 2013); 3 pages; RAN WG1 Meeting #74bis, Guangzhou, China; (Rel-12).
Catt; "Configuration of subframes for explicit UL-DL reconfiguration DCI"; 3GPP TSG R1-136066; (Nov. 11-15, 2013); 3 pages; RAN WG1 Meeting #75, San Francisco, USA; (Agenda 6.2.1.2).
Catt; "Remaining details of L1 signaling for UL-DL reconfiguration"; 3GPP TSG R1-140067; (Feb. 10-14, 2014); 6 pages; RAN WG1 Meeting #76, Prague, Czech Republic; (Agenda 7.2.1.3).
Huawei Hisilicon; "Physical layer signaling design for TDD eIMTA"; 3GPP TSG R1-135013; (Nov. 11-15, 2013); 6 pages; RAN WG1 Meeting #75, San Francisco, USA; (Agenda 6.2.1.2).
NTT Docomo; "Discussion on Backhaul Signaling for eIMTA"; 3GPP TSG R1-133450; (Aug. 19-23, 2013); 6 pages; RAN WG1 Meeting #74, Barcelona, Spain; (Agenda 7.2.3.1).
Samsung; "Signaling for TDD UL-DL Reconfiguration"; 3GPP TSG R1-133094; (Aug. 19-23, 2013); 5 pages; RAN WG1 Meeting #74, Barcelona, Spain; (Agenda 7.2.3.2).
NEC Group; "Reconfiguration Signalling for TDD eIMTA System;" 3GPP TSG R1-132331; (May 20-24, 2013); 3 pages; RAN WG1 Meeting #73, Fukuoka, Japan; (Agenda 6.2.3.2).
NTT Docomo; "Physical Layer Design for Dual Connectivity;" 3GPP TSG R1-130409; (Jan. 28-Feb. 1, 2013); 3 pages; RAN WG1 Meeting #72, St. Julian's, Malta; (Agenda 7.3.5.4).

* cited by examiner

| DCI format X Config $I_{DCI}$ | Binary | Configuration Period $T_{DCI}$ (subframes) | Transmission offset $\Delta_{DCI}$ (subframes) |
|---|---|---|---|
| 0 | 0000 | 10 | 0 |
| 1 | 0001 | 10 | 1 |
| 2 | 0010 | 10 | 2 |
| 3 | 0011 | 10 | 3 |
| 4 | 0100 | 20 | 0 |
| 5 | 0101 | 20 | 1 |
| 6 | 0110 | 20 | 2 |
| 7 | 0111 | 20 | 3 |
| 8 | 1000 | 40 | 0 |
| 9 | 1001 | 40 | 1 |
| 10 | 1010 | 40 | 2 |
| 11 | 1011 | 40 | 3 |
| 12 | 1100 | 80 | 0 |
| 13 | 1101 | 80 | 1 |
| 14 | 1110 | 80 | 2 |
| 15 | 1111 | 80 | 3 |

FIG. 4

```
DCI-DL-ConfigDedicated-r12 ::=   SEQUENCE {
    release                          NULL,
    DCI-ConfigIndex                  INTEGER (0..15),
}
```

FIG. 5A

| *DCI-UL-Config* field descriptions |
|---|
| *DCI-ConfigIndex* <br> Parameter: $I_{DCI}$, defined for DCI format X configuration applied for TDD system. |

FIG. 5B

TIME DIVISION DUPLEX (TDD) UPLINK DOWNLINK (UL-DL) RECONFIGURATION

RELATED APPLICATIONS

This application is a continuation of U.S. patent application Ser. No. 15/136,743 filed Apr. 22, 2016, which is a divisional of U.S. patent application Ser. No. 14/226,264 filed Mar. 26, 2014, which claims the benefit of U.S. Provisional Patent Application No. 61/841,230, filed Jun. 28, 2013, the entire specifications of which are hereby incorporated by reference in their entirety for all purposes.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the nodes, such as macro nodes and low power nodes in a HetNet.

Homogeneous networks or HetNets can use time-division duplexing (TDD) for DL or UL transmissions. Time-division duplexing (TDD) is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 is a table of downlink control information (DCI) format X periodicity and subframe offset configurations in accordance with an example;

FIG. 5A illustrates an abstract syntax notation (ASN) code example of a downlink control information (DCI) format X configuration in accordance with an example;

FIG. 5B is a table of downlink control channel (DCI) configuration index field descriptions in accordance with an example;

reconfiguration in a heterogeneous network (HetNet) in accordance with an example.

Figure 1:
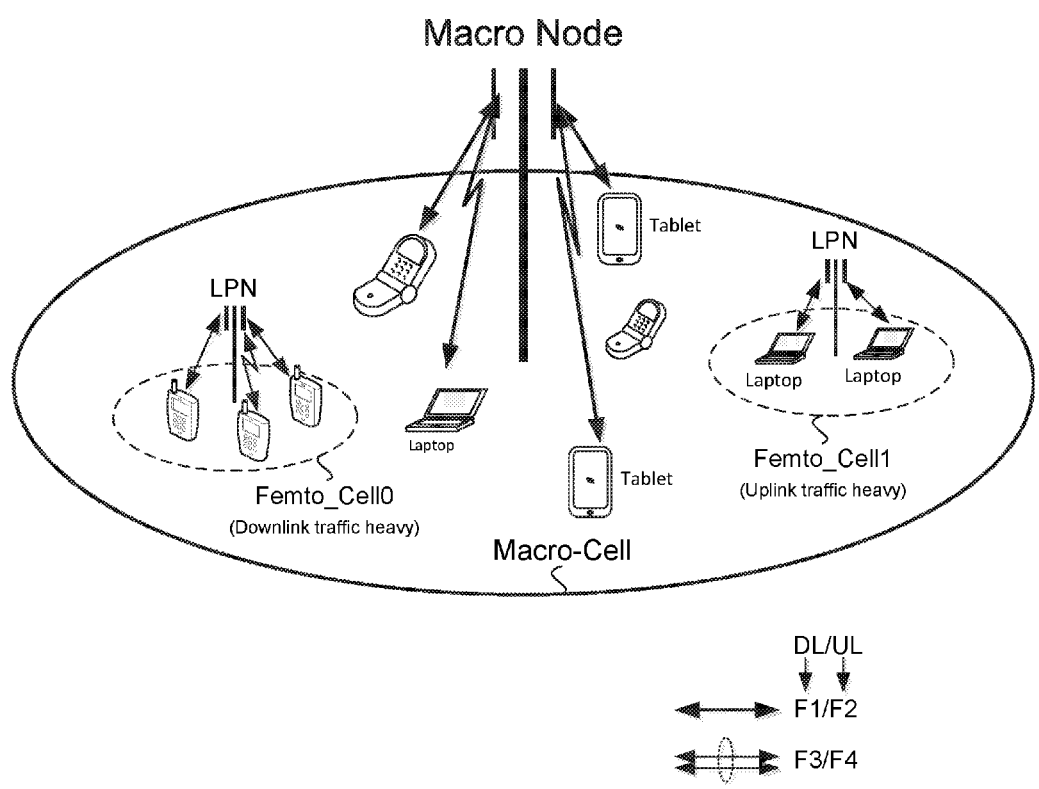
FIG. 1 illustrates a diagram of dynamic uplink-downlink (UL-DL) reconfiguration usage in a time-division duplexing (TDD) system in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A dynamic Time Division Duplex (TDD) uplink-downlink (UL-DL) reconfiguration scheme for heterogeneous networks (HetNets) is described herein. A plurality of evolved node Bs (eNBs) in a cell cluster may exchange inter-eNB messages over an X2 interface. The eNBs in the cell cluster may have a backhaul latency within a selected range. The inter-eNB messages may contain cluster metrics associated with the eNBs, wherein the cluster metrics may include UL-DL configurations being used by eNBs within the cell cluster, DL-UL resources required by each eNB, and/or buffer sizes in UL and DL transmission direction and packet delays. An eNB in the cell cluster may select a TDD UL-DL configuration index for the plurality of eNBs in the cell cluster using the cluster metrics. In other words, the eNB may use the inter-eNB messages, and the cluster metrics within the inter-eNB messages, to negotiate a unified UL-DL configuration in a distributed manner for multiple cells within a cell cluster.

The eNB may transmit the TDD UL-DL configuration index to at least one user equipment (UE) located within the cell cluster. The eNB may transmit the TDD UL-DL configuration index using a downlink control information (DCI) format (i.e., referred to as DCI format X herein), wherein the TDD UL-DL configuration index is transmitted on a Common Search Space (CSS) of a physical downlink control channel (PDCCH) on a UE-specific Primary Cell (PCell). In addition, the eNB may inform the UE, via a Uu interface, of reconfiguration DCI monitoring subframes using one of a bitmap technique or according to a DCI format X periodicity and subframe offset configuration. As a result, the UE configured with UL-DL reconfiguration may monitor the DCI format X in a smaller subset of configured DL subframes per duty cycle, thereby providing a significant reduction in power consumption at the UE. In addition, supporting different UL/DL configurations for each individual Transmission Point (TP) in CoMP scenario 4 may be required when instantaneous UL/DL ratio is not correlated within each TP's cell. Therefore, DCI format X monitoring subframes for a plurality of TPs in CoMP scenario 4 may be time multiplexed onto different subframes to indicate independent UL/DL configuration in use.

Heterogeneous network (HetNet) deployments can offer efficient means to increase cellular coverage and capacity compared to traditional homogeneous networks and may involve the co-existence of different radio access technologies (RAT), transmission-reception techniques, and base station (BS) or node transmission powers amongst other possible architectural combinations. The RAT can include the standard used, such as LTE or IEEE 802.16, or the version of the standard, such as LTE version 11, 3GPP LTE V11.0.0, IEEE 802.16n, or IEEE 802.16p. In an example, the radio access technology (RAT) standard can include LTE release 8, 9, 10, 11, or subsequent release. The transmission-reception technique can include various transmission techniques, such as a downlink (DL) coordinated multi-point (CoMP) transmission, enhanced inter-cell interference coordination (eICIC), and combinations thereof. A node transmission power can refer to the power generated by a node type, such as a macro node (e.g., macro evolved Node B (eNB)) in a macro cell and multiple low power nodes (LPNs or small eNBs) in the respective small cells, as illustrated in FIG. 1.

LTE TDD systems may operate synchronously in order to avoid strong DL-UL inter-cell interference between base stations (eNBs) and/or mobile terminals (UEs). The synchronous operation may imply that all cells in a network area use the same UL-DL configuration, wherein the UL-DL configuration may represent a frame configuration and can define an amount of DL and UL resources and is associated with an exclusive UL/DL ratio in a radio frame. In addition, frame transmission boundaries may be aligned in time.

Although synchronous operation may be effective from an interference mitigation perspective, synchronous operation may not be optimal in terms of traffic adaptation and may significantly degrade the perceived packet throughput in small cells. In addition, using the same frame configuration in HetNet deployments, with many low power nodes distributed over a typical macro cell area, may be inefficient from a user experience perspective. The traffic in HetNet deployments may significantly vary over time or cell domains. At a given time instance, a particular set of cells may have dominant traffic in one transmission direction (i.e., either DL or UL), so that additional spectrum resources are required in the dominant traffic direction. In HetNet deployments, a level of isolation between eNBs may be higher as compared to a macro cell environment because of the proximity of the small cells to the end users. As a result, a relatively large portion of the eNBs may be considered as isolated cells. These isolated cells may modify an UL-DL configuration in order to adapt to the instantaneous traffic conditions. On the other hand, small cells located relatively close to each other may experience strong coupling on eNB links. The strong coupling may result in DL transmissions in one cell causing interference to the UL reception in neighboring cells.

Cell-clustering may be an effective solution for resolving DL-UL interference mitigation in small cells. In cell clustering, a set of coupled cells may be combined into a cell cluster and joint traffic adaptation may be performed among the small cells. Cell clustering may be efficient when coupled cells are served by the same eNB so that information about traffic conditions from all cells is available to an eNB scheduler. The eNB scheduler may determine an optimal frame configuration on a relatively fast timescale. However, the coupled small cells may not be controlled by the same eNB. When the coupled small cells are not controlled by the same eNB, coordinating scheduling decisions among cells may become difficult because a centralized solution for the coupled small cells may be unavailable. Dynamic traffic adaptation may be performed by selecting the same UL-DL configuration if an adaptation time-scale (e.g., an UL-DL reconfiguration period of 10 milliseconds (ms) is smaller than a backhaul latency (e.g., 40 ms-160 ms), as discussed in further detail in 3GPP Technical Report (TR) TR 36.932. In this case, the dynamic UL-DL reconfiguration may cause strong DL-UL interference at the subframes having opposite transmission directions in neighboring cells.

The backhaul latency may complicate decision making on a frame configuration between coupled eNBs. The backhaul latency may also complicate control of the DL-UL interference if there is no coordination among cells. Although the DL-UL interference mitigation issue may be resolved by prohibiting traffic adaptation when coupled cells are connected with a backhaul latency exceeding a 10 ms traffic adaptation time scale, such an approach may be inefficient from a traffic adaptation perspective. As described in greater detail herein, the UL-DL reconfiguration time scale may be adjusted to the backhaul latency characteristics. In this case, cell-clustering may be applied at a lower time scale and the network may avoid situations where one of the cells becomes an aggressor in terms of DL-UL interference, thereby causing degradation to an UL performance experience.

A number of signaling options have been discussed for enhanced Interference Mitigation and Traffic Adaptation (eIMTA), including system information block (SIB), paging, radio resource control (RRC), media access control (MAC) signaling, L1 signaling, and characteristics of different traffic adaptation time scales. The signaling of the UL/DL reconfiguration may use explicit L1 signaling of reconfiguration by UE-group-common Enhanced Physical Downlink Control Channel (ePDCCH) or Physical Downlink Control Channel (PDCCH), referred to as (e)PDCCH herein, due to lower control overhead. The UE-group-common (e)PDCCH may refer to enhanced Control Channel Elements (eCCEs) or Control Channel Element (CCE) commonly monitored by groups of UEs for control information. When the (e)PDCCH is used, downlink control information (DCI) carriers by UE-group-common (e)PDCCH may be referred to as common DCI herein.

However, using explicit L1 signaling of reconfiguration by UE-group-common (e)PDCCH may result in several potential problems. Higher power consumption may be expected due to additional blind-detection attempts performed on UE-group-common (e)PDCCH when the UE does not know the existence of common DCI and the size of common DCI is different as compared with existing DCIs. Some mechanisms may be required to be developed to further optimize the power consumption at the UE side and improve the network capability to flexibly configure the UL/DL configuration via common DCI transmission subframes according to the cell its own instantaneous cell-specific traffic, etc.

In addition, using the explicit L1 signaling may not support coordinated multipoint (CoMP) scenario 4. In CoMP scenario 4, all transmission points (e.g., macro nodes, pico nodes, remote radio heads, and low power nodes) within the coverage area of the macro point may share the same physical cell identifier (Cell-ID). It may be desirable to support independent UL/DL configurations for transmission points (TPs) at different geographical locations in order to maximize throughput performance since an instantaneous traffic status may be different in different TP coverage.

A dynamic UL-DL reconfiguration is described herein with configurable and synchronized configuration of duty cycles and subframe offsets. The UL-DL reconfiguration may be used in a variety of practical scenarios with different backhaul characteristics. In addition, the UL-DL reconfiguration may reduce a power consumption level at the UE and enable independent UL/DL reconfigurations for different RRHs in CoMP scenario 4. Therefore, the proposed UL-DL reconfiguration scheme achieves a power-efficient UL/DL reconfiguration indication and CoMP scenario 4 support for dynamic TDD UL/DL reconfiguration.

FIG. 1 illustrates a layered HetNet deployment with different node transmission powers using time-division duplexing (TDD). As used herein, a cell can refer to the node or the coverage area of the node. A low power node (LPN) can refer to a small node, which can include a small eNB, a micro eNB, a pico node, a pico eNB, a femto-eNB, a home eNB (HeNB), a remote radio head (RRH), a remote radio equipment (RRE), or a remote radio unit (RRU). As used herein, the term "small node" may be used interchangeably with the term "pico node" (or pico eNB), and the term "small cell" may be used interchangeably with the term "pico cell" in the examples to assist in distinguishing between the macro node and the LPN or the small node, and the macro cell and the small cell. The macro node can be connected to each LPN via backhaul link using X2 interface or optical fiber connections.

The macro nodes can transmit at high power level, for example, approximately 5 watts (W) to 40 W, to cover the macro cell. The HetNet can be overlaid with low power nodes (LPNs), which may transmit at substantially lower power levels, such as approximately 100 milliwatts (mW) to 2 W. In an example, an available transmission power of the macro node may be at least ten times an available transmission power of the low power node. A LPN can be used in hot spots or hot-zones, referring to areas with a high wireless traffic load or high volume of actively transmitting wireless devices (e.g., user equipments (UEs)). A LPN can be used in a microcell, a picocell, a femtocell, and/or home network. Femto_Cell0 illustrates downlink traffic heavy usage by the wireless devices (e.g., UEs) and Femto_Cell1 illustrates uplink traffic heavy usage by the wireless devices.

Allowing adaptive UL-DL configurations depending on traffic conditions in different cells can significantly improve the system performance in some examples. FIG. 1 illustrates an example where different UL-DL configurations can be considered in different cells. Networks (e.g., HetNets or homogeneous networks) can involve a same carrier or different carriers deployed by a single operator or different operators in the same band and employing either a same or different uplink-downlink (UL-DL) configurations. Where possible, interference may include adjacent channel interference (when different carrier frequencies are used) as well as co-channel interference (when a same carrier frequency is used) such as remote node-to-node interference (or BS-to-BS interference or eNB-to-eNB interference).

Legacy LTE TDD can support asymmetric UL-DL allocations by providing seven different semi-statically configured uplink-downlink configurations. Table 1 illustrates seven UL-DL configurations used in LTE, where "D" represents a downlink subframe, "S" represents a special subframe, and "U" represents an uplink subframe. In an example, the special subframe can operate or be treated as a "truncated" downlink subframe.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As illustrated by Table 1, UL-DL configuration 0 can include 6 uplink subframes in subframes 2, 3, 4, 7, 8, and 9, and 4 downlink and special subframes in subframes 0, 1, 5, and 6; and UL-DL configuration 5 can include one uplink subframe in subframe 2, and 9 downlink and special subframes in subframes 0, 1, and 3-9.

As an underlying requirement in some examples, all cells of the network change UL-DL (TDD) configurations synchronously in order to avoid the interference. However, such a requirement can constrain the traffic management capabilities in different cells of the network. The legacy LTE TDD set of configurations can provide DL subframe allocations in the range between 40% and 90%, as shown in Table 1. The UL and DL subframes allocation within a radio frame can be reconfigured through system information broadcast signaling (e.g., system information block [SIB]). Hence, the UL-DL allocation once configured can be expected to be changed semi-statically.

Predetermined or semi-statically configured UL-DL configurations may not match the instantaneous traffic situation which can result in inefficient resource utilization, especially in cells with a small number of users that download or upload large amounts of data. Adaptive UL-DL configurations can be used to handle cell-dependent traffic asymmetry and match instantaneous traffic situations but can generate different types of interferences if not taken into consideration. For such time division LTE (TD-LTE) deployments with different UL-DL configurations in different cells, the new types of interferences due to asymmetric UL-DL configurations can include node-to-node (or BS-to-BS) and UE-to-UE interference, which can be mitigated using various mechanisms described herein. The impact of the inter-cell UL-DL (node-to-node) interference can significantly reduce the benefits obtained from the adaptability of UL-DL configurations in different cells.

As described herein, a dynamic uplink-downlink (UL-DL) reconfiguration scheme may include configurable and synchronized duty cycles, so that the dynamic UL-DL reconfiguration may be used in a variety of practical scenarios with different backhaul characteristics.

Figure 2A:
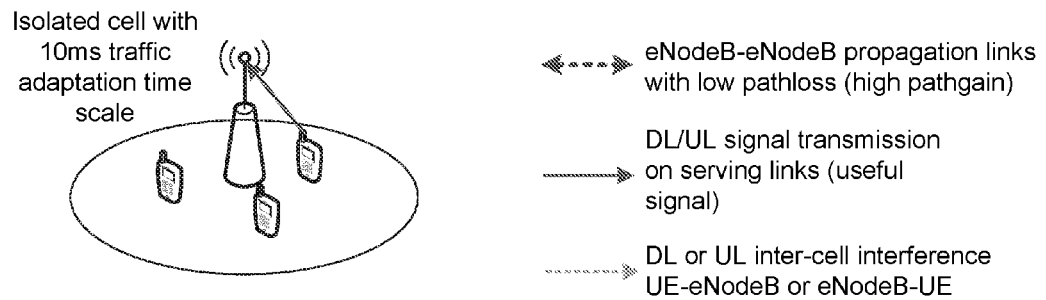
FIGS. 2A-2C illustrate a time-division duplexing (TDD) system with various traffic adaptation time scales in accordance with an example.
Figure 2B:
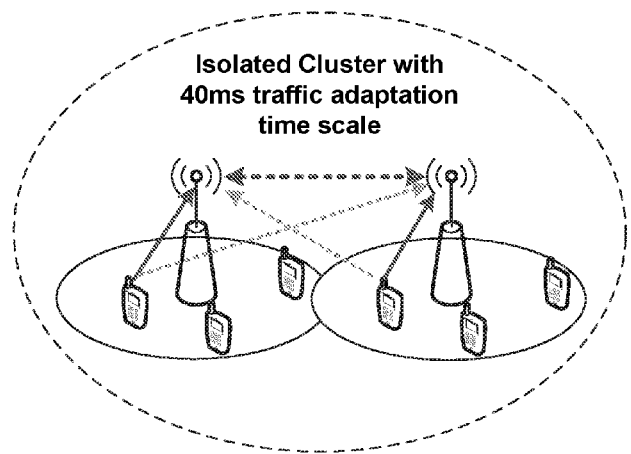
Figure 2C:
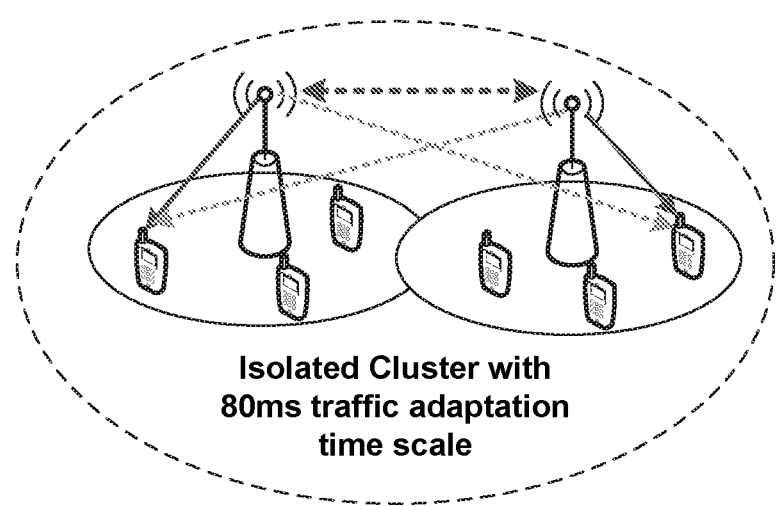

FIGS. 2A-2C illustrates exemplary time-division duplexing (TDD) systems with various traffic adaptation time scales. FIG. 2A illustrates an isolated cell with a 10 millisecond (ms) adaptation time scale. FIG. 2A illustrates a downlink or uplink (DL/UL) signal transmission on serving links between a UE and an eNB. FIG. 2B illustrates as isolated cell cluster with a 40 ms traffic adaptation time scale. FIG. 2B illustrates eNB-eNB propagation links with a low path loss between a first eNB and a second eNB. In addition, FIG. 2B illustrates a DL or UL inter-cell interference between a UE and an eNB. FIG. 2C illustrates an isolated cell cluster with an 80 ms traffic adaptation time scale. FIG. 2C illustrates eNB-eNB propagation links with a low path loss between a first eNB and a second eNB. In addition, FIG. 2C illustrates a DL or UL inter-cell interference between a UE and an eNB.

Backhaul latency characteristics may be generally known to network operators. The one-way backhaul latency in operator-controlled networks may be in a range from 5 ms (e.g., Fiber Access 1) to 60 ms (e.g., DSL technology). Therefore, different UL-DL reconfiguration periods may be assumed for isolated cells and coupled cells combined into one cluster (e.g., two coupled cells). For instance, a period of 10 ms, 40 ms, 80 ms, or 160 ms may be assumed for different types of backhaul links that connect coupled eNBs. Therefore, multiple reconfiguration periods may be supported. As a result, the isolated cells may be configured with the 10 ms adaptation time scale, and the cells clusters formed from coupled cells may be configured with a lower/higher adaptation time scale. The traffic adaptation time scale in the clusters may depend on multiple factors, including a number of cells in the cell cluster and backhaul latency characteristics.

Therefore, the TDD UL-DL configuration index for the plurality of eNBs in the cell cluster may be selected according to a defined periodicity, wherein the defined periodicity is based on the backhaul latency of the plurality of eNBs in the cell cluster and includes 10 milliseconds (ms), 20 ms, 40 ms and 80 ms. Information about the UL-DL reconfiguration period may be communicated to the cells over an X2 interface and pre-configured by the network operator.

Figure 3:
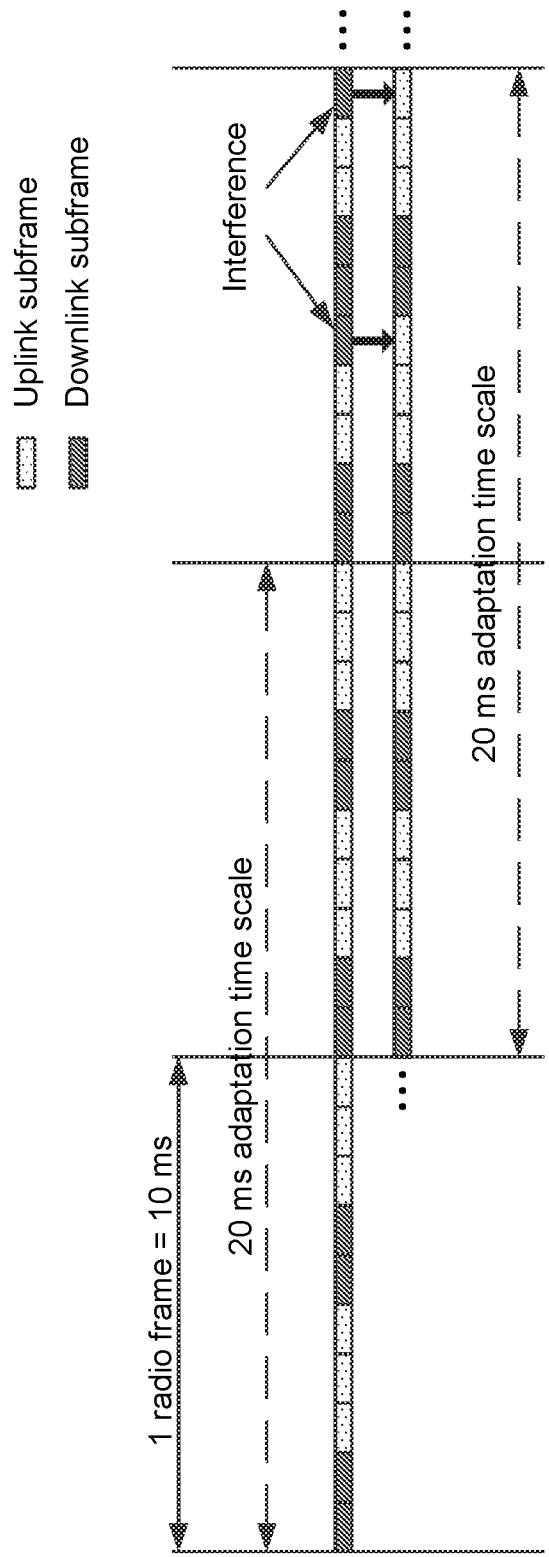
FIG. 3 illustrates uplink downlink (UL-DL) interference due to non-aligned UL-DL reconfiguration switching points in accordance with an example.

FIG. 3 illustrates uplink downlink (UL-DL) interference due to non-aligned UL-DL reconfiguration switching points. In addition to determining the UL-DL reconfiguration period when using cell-clustering based techniques for DL-UL interference mitigation, UL-DL reconfigurations may be performed synchronously in order to avoid DL-UL interference. In other words, the UL-DL reconfigurations may be performed at the same frame instances in time. As shown in FIG. 3, having different switching points at coupled eNBs may result in DL-UL interference. Therefore, in order to synchronize the UL-DL reconfiguration switching points, a system frame number (SFN) counter may be used so that each cell updates its UL-DL configuration synchronously in time. In other words, UL-DL the reconfiguration periods may be aligned in time in order to avoid DL-UL interference. The SFN counter may be used to control a radio frame having a SFN mod periodicity of zero, wherein a TDD UL-DL configuration index is applied by eNBs in the cell cluster so that the TDD UL-DL configuration is synchronously updated by eNBs within the cell cluster.

In order to perform the same distributed decisions on the actual UL-DL configuration to be applied over the air, a distributed protocol may be used. The cells may exchange information about traffic conditions for each transmission direction among coupled cells in cluster. In other words, a TDD UL-DL configuration index for the plurality of eNBs in the cell cluster may be selected based on cluster metrics, wherein the cluster metrics are exchanged between the plurality of eNBs in the cell cluster over an X2 interface. As an example, a cell cluster may include a first eNB, a second eNB and a third eNB. The first eNB may send cluster metrics associated with the first eNB to the second eNB and the third eNB. Similarly, the first eNB may receive cluster metrics from the second eNB and the third eNB.

Examples of cluster metrics exchanged between the eNBs may include the DL and UL buffer status combined with the DL and UL packet throughputs. In addition, the cells may exchange information regarding the preferred UL-DL configuration for the next reconfiguration cycle. This information may be considered as the rough quantized measure of the DL and UL traffic demands.

The LTE legacy set of UL-DL configuration supports the following proportion between DL and UL subframes: 4:6, 5:5, 6:4, 7:3, 8:2, 9:1. This set may be extended to cover the whole set of possible proportions by adding 0:10, 1:9, 2:8, 3:7, 4:6, 10:0. If the preferred UL-DL configurations are exchanged over the X2 interface, then cells may apply one of the predefined strategies to perform traffic adaptation. For instance, each cell may select the UL-DL configuration with a minimum number of DL subframes among all received UL-DL configurations. Alternatively, cells may select DL/UL balanced configuration by selecting the average number of DL subframes that can be applied in all cells.

In order to force coupled eNBs to choose the same TDD configuration, the following distributed decision at each eNB can be made: tddConfigIndex=decisionFunction(M1, M2, . . . , MN), wherein tddConfigIndex is a chosen UL-DL configuration index, Mi are cluster metrics exchanged between eNBs in a cell cluster, and decision Function is an algorithm to decide about the new UL-DL configuration. Since the eNBs may receive equal sets of cluster metrics, the above algorithm can calculate equal TDD configuration indexes for the eNBs in a cell cluster, and thus align transmission directions.

In some examples, the cluster metrics exchanged between eNBs in the cell cluster may include, but is not limited to, UL-DL configurations, a relative amount of required DL/UL resources, buffer sizes in UL and DL, and packet delays. In addition, the decision function described above may choose the TDD configuration which corresponds to a mean of the reported cluster metrics or the chosen TDD configuration may correspond to a maximum (or minimum) of the reported cluster metrics.

Signaling may be provided to UE terminals in order to support dynamic UL-DL reconfiguration with a configurable time scale. In other words, the signaling may be for power-efficient TDD UL-DL reconfiguration indication. The eNB may transmit the TDD UL-DL configuration index to one or more UEs located within the cell cluster. The signaling may be considered independently from the DL-UL interference mitigation scheme described above (i.e. cell-clustering) and applied in order to reduce UE power consumption, decrease system overhead, improve link adaptation, increase reception reliability and provide long-term traffic adaptation decisions.

In order to support the UL/DL reconfiguration, a new downlink control information (DCI) format, called as DCI format X herein, may be used for the UL/DL reconfiguration indication. The DCI format X may be the DCI format of its corresponding common DCI used for the UL/DL reconfiguration indication. The TDD UL-DL configuration index may be transmitted on a UE-group-common Enhanced Physical Downlink Control Channel (EPDCCH) or Physical Downlink Control Channel (PDCCH).

The DCI format X transmission may include a configurable duty cycle and subframe offset design. The configurable DCI format X transmission subframes may offer several advantages, such as the UE configured with UL-DL re-configuration may only monitor the DCI format X in smaller subset of configured DL subframe(s) per duty cycle, thereby providing a significant reduction in power consumption. In addition, different DCI format X may be required in order to support CoMP scenario 4 with different UL/DL configurations. Therefore, as described in further detail below, the DCI format X for different remote radio heads (RRHs) in CoMP scenario 4 may be configured to be time-multiplexed onto different subframes to be used to indicate independent UL/DL configurations.

In order to reduce a false detection probability and avoid unnecessary blind decoding attempts, DCI format X may be transmitted only in subframes which are used for downlink transmission in all legacy UL/DL configurations. In other words, DCI format X may be allowed to be transmitted on subframe #0, #1, #5 and #6 in each frame. The periodicity of DCI format X may be configurable and represented as a predefined set of possible configurations.

FIG. 4 is an exemplary table of downlink control information (DCI) format X periodicity and subframe offset configurations. The periodicity for transmitting DCI format X, from an eNB in the cell cluster to the UE, may vary from 10 ms to 80 ms in a TDD system, as shown in FIG. 4. A DCI format X configuration $I_{DCI}$ may range from 0 to 15. The DCI format X configuration $I_{DCI}$ may be represented in a binary format (e.g., 0000, 0101, and 1001). A configuration period $T_{DCI}$ may range from 10 subframes to 80 subframes. In addition, a transmission offset may range from 0 subframes to 3 subframes.

The eNB may inform the UE, via a Uu interface, of the reconfiguration DCI monitoring subframes using the exemplary table shown in FIG. 4 or a bitmap technique. An X-bit bitmap may indicate a set of system information block type 1 (SIB1) downlink or special (DL/S) subframes (SIB-1 DL/S subframes). Starting from a most significant bit (MSB) to a least significant bit (LSB), the bitmap corresponds to subframe #{[Xa, Xb, Xc, . . . ]}. The bit "1" may indicate that the UE shall monitor the reconfiguration DCI in the corresponding subframe, and the bit "0" may indicate that the UE shall not monitor the reconfiguration DCI in the corresponding subframe.

The periodicity of the reconfiguration signals may include 10 ms, 20 ms, 40 ms, or 80 ms. The UE may monitor the reconfiguration signals in downlink subframes or special subframes according to UL/DL configuration indicted in SIB1. The UE may be configured to monitor the reconfiguration signals in more than one subframe between two adjacent periodic instances. The detected configuration may be valid for a window where the window has a duration equal to the periodicity of the reconfiguration signals. The UE may assume the same configuration for two or more reconfiguration signals, if the two or more reconfiguration signals are detected in subframes within a window of a duration equal to the periodicity of the reconfiguration signals. In addition, the UE may not assume the same configuration for reconfiguration signals detected in subframes across different windows.

FIG. 5A illustrates an abstract syntax notation (ASN) code example of a downlink control information (DCI) format X configuration. FIG. 5B is a table of downlink control channel (DCI) configuration index field descriptions. A configuration of the DCI format X transmission may be indicated by the eNB through UE-Specific dedicated RRC signaling for each serving cell independently using a 4-bit UE-Specific parameter. As shown in FIG. 5A, the DCI configuration index may range from 0 to 15. As shown in FIG. 5B, the DCI configuration index may include an $I_{DCI}$ parameter, wherein $I_{DCI}$ is defined for the DCI format X configuration that is applied for the TDD system.

Since UL/DL reconfiguration is particularly beneficial for a typical Enhanced Interference Mitigation & Traffic Adaptation (eIMTA) scenario where a limited number of UEs have traffic to be served, the signaling overhead for the UL-DL reconfiguration indication may be minimal. When no configuration of DCI format X transmission is received, UE may follow a fallback configuration that is either the UL/DL configuration indicated in the System Information Block 1(SIB1) or a latest UL/DL configuration indicated by the DCI format X transmission.

Figure 6:
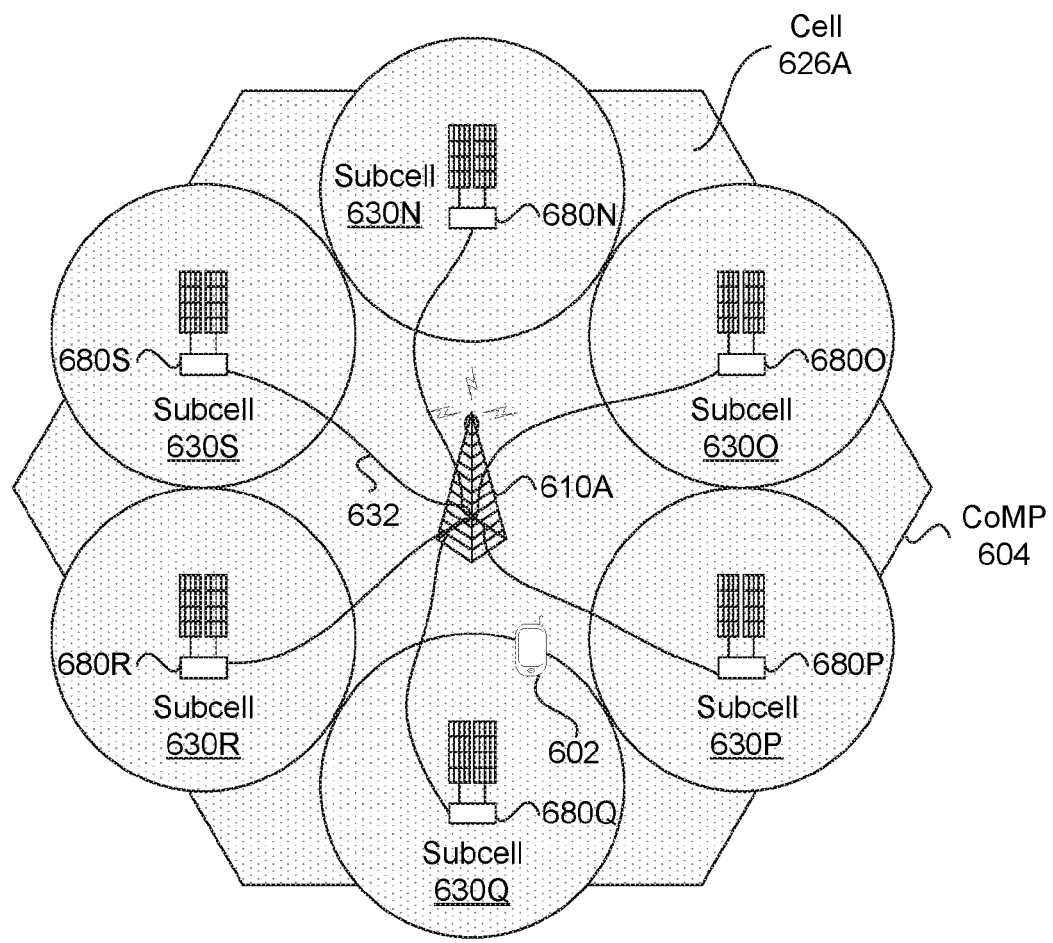
FIG. 6 illustrates a block diagram of a coordinated multipoint (CoMP) system in a heterogeneous network with low power nodes in accordance with an example.

FIG. 6 illustrates an example of a CoMP system with low power nodes (LPNs) in a macro cell coverage area. FIG. 6 can illustrate LTE CoMP scenarios 3 and 4. In the intra-site CoMP example illustrated in FIG. 6, LPNs (or RRHs) of a macro node 610A may be located at different locations in space, and CoMP coordination may be within a single macrocell. A coordination area 604 can include eNBs 610A and LPNs 680N-S, where each LPN can be configured to communicate with the eNB via a backhaul link 632 (optical or wired link). A cell 626A of a macro node may be further sub-divided into sub-cells 630N-S. LPNs (or RRHs) 680N-S may transmit and receive signals for a sub-cell. A wireless device 602 can be on a sub-cell edge (or cell-edge) and intra-site CoMP coordination can occur between the LPNs (or RRHs) or between the eNB and the LPNs. In CoMP scenario 3, the low power RRHs providing transmission/reception points within the macrocell coverage area can have different cell IDs from the macro cell. In CoMP scenario 4, the low power RRHs providing transmission/reception points within the macrocell coverage area can have a same cell ID as the macro cell.

Figure 7A:
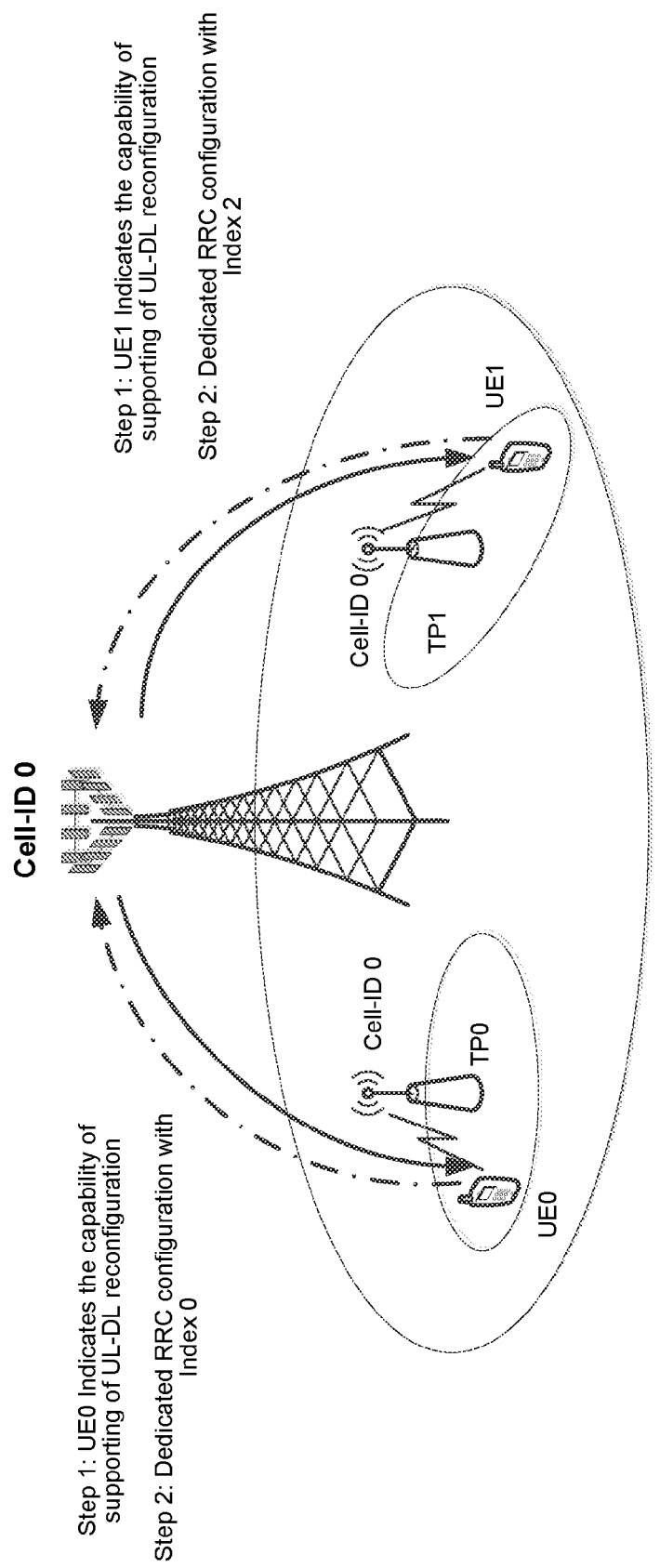
FIG. 7A illustrates a downlink control channel (DCI) format X transmission in a coordinated multipoint (CoMP) scenario 4 in accordance with an example.

FIG. 7A illustrates a downlink control channel (DCI) format X transmission in a coordinated multipoint (CoMP) scenario 4. DCI format X transmissions from low power remote radio heads (RRHs) with a same cell IDs within a macro-cell coverage may be time-domain multiplexed by assigning them to different subframe offsets together with same or different duty cycles, depending on instantaneous traffic conditions associated with the RRHs. FIG. 7A illustrates setting the periodicity and subframe offset of DCI format X. Two RRHs, i.e., Transmission Point 1 (TP1) and TP2, may be within a macro coordination area having the same cell-ID (e.g., Cell-ID 0). Upon receiving the UE capability of UL-DL reconfiguration support in Step 1, the network may indicate the DCI format X subframe configuration in Step 2 for each UE according to its geographical location. In the example shown in FIG. 7A, the network may send a dedicated RRC configuration with index 0 to a UE in proximity to TP0. In addition, the network may send a dedicated RRC configuration with index 2 to a UE located in proximity to TP1. As a result, the network may take advantage of flexible and independent UL-DL configuration for TP0 and TP1 separately depending on instantaneous traffic conditions associated with TP0 and TP1.

As the DCI format X may be required to be received with high reliability (e.g., with DCI decoding error probability in the range of 1e-5 and 1e-6), the DCI format X may be transmitted repeatedly within a fixed repetition period (e.g. 5 ms or 10 ms). The repetition mechanism may also be used with a configurable DCI format X periodicity and offset with proper configuration selection at the network side.

Figure 7B:
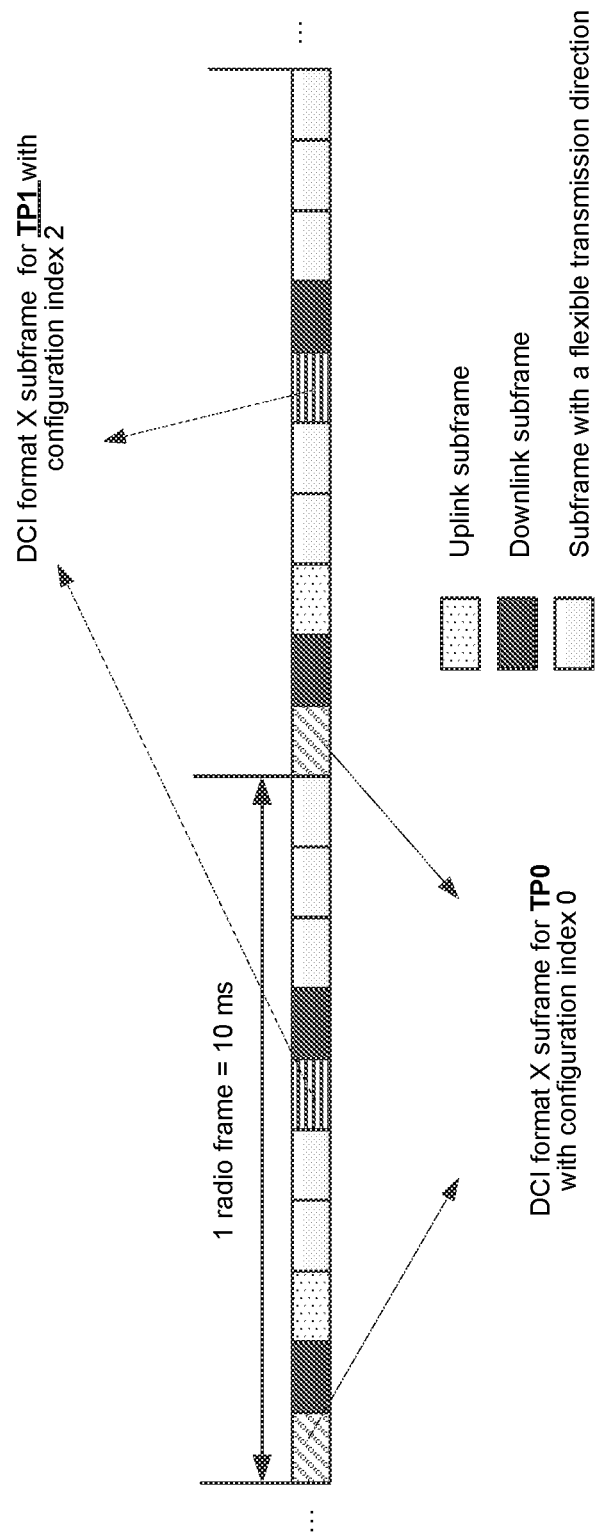
FIG. 7B illustrates a radio frame with downlink control channel (DCI) format X subframes for a DCI format X transmission in a coordinated multipoint (CoMP) scenario 4 in accordance with an example.

FIG. 7B illustrates a radio frame with downlink control channel (DCI) format X subframes for a DCI format X transmission in a coordinated multipoint (CoMP) scenario 4. As shown in FIG. 7B, the DCI format X transmission may include a DCI format X subframe for TP0 with a configuration index 0 in a first subframe of a radio frame. In addition, the DCI format X transmission may include a DCI format X subframe for TP1 with a configuration index 2 in a sixth subframe of a radio frame.

Figure 8:
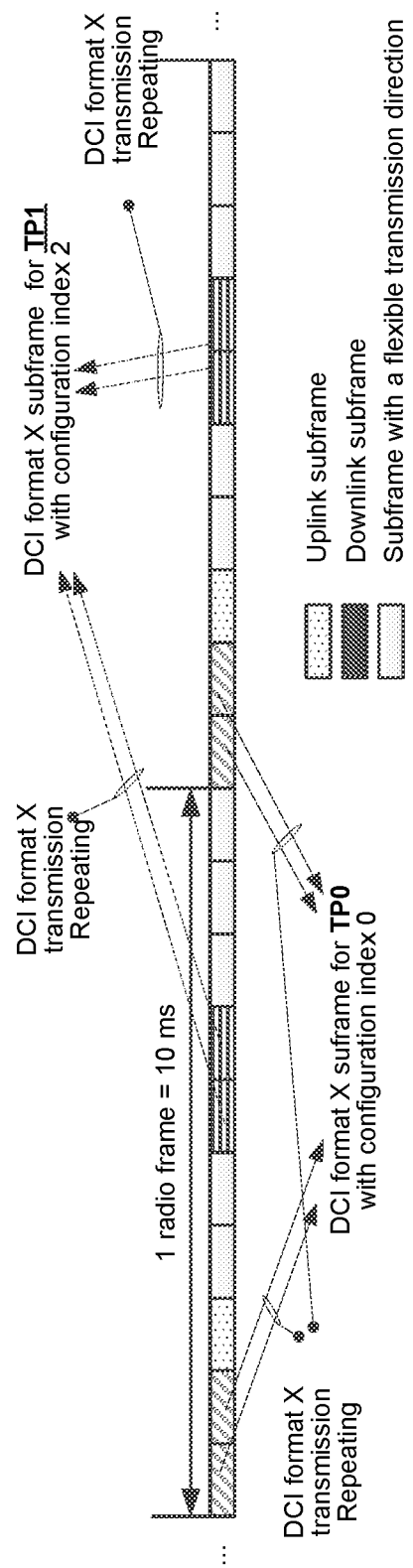
FIG. 8 illustrates a radio frame with downlink control channel (DCI) format X subframes having a repeated transmission pattern for a DCI format X transmission in a coordinated multipoint (CoMP) scenario 4 in accordance with an example.
Figure 9:
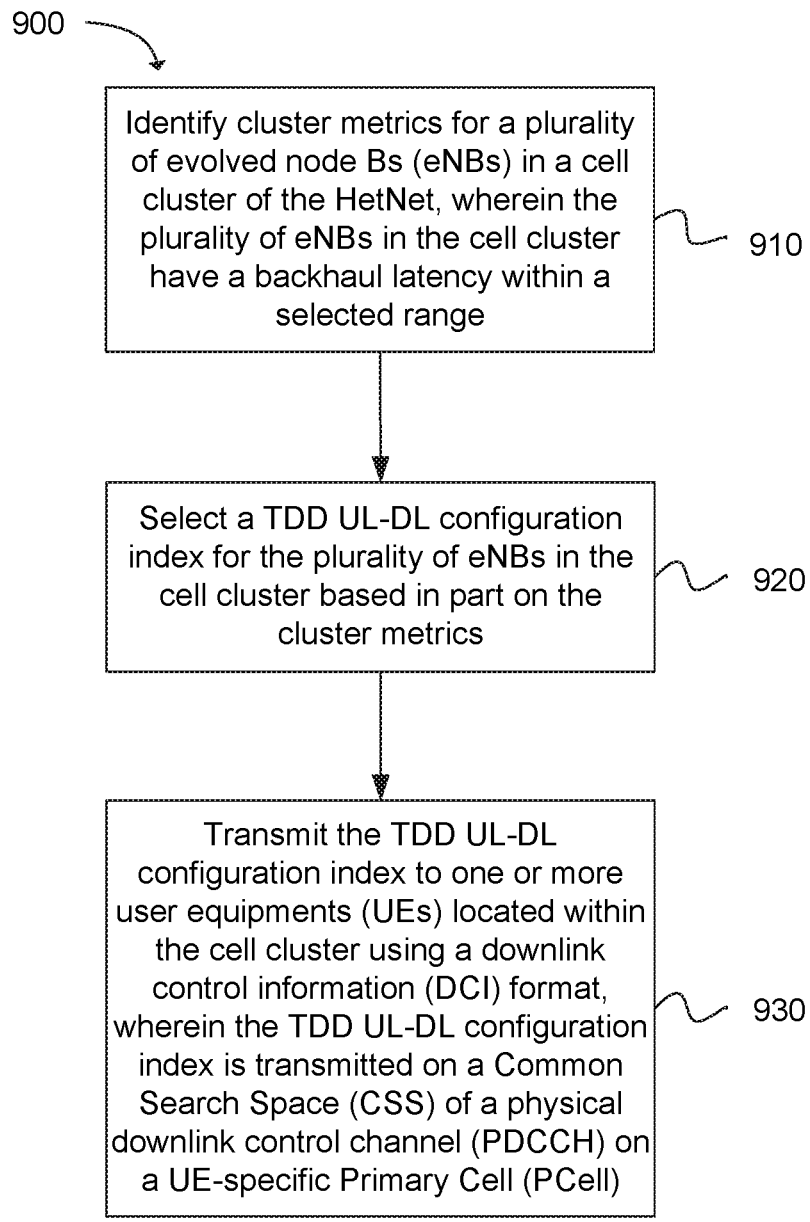
FIG. 9 depicts functionality of computer circuitry of an evolved node B (eNB) operable to perform a Time Division Duplex (TDD) uplink-downlink (UL-DL) reconfiguration in a heterogeneous network (HetNet) in accordance with an example.

FIG. 8 illustrates a radio frame with downlink control channel (DCI) format X subframes having a repeated transmission pattern for a DCI format X transmission in a coordinated multipoint (CoMP) scenario 4. The DCI format X may be transmitted twice per 5 ms. As an example, in order to achieve an independent UL/DL configuration setting in TP0 and TP1, the network may appropriately select configuration index 0 and 2 for the DCI format X transmission. The corresponding DCI format X transmission patterns for TP0 and TP1 with a 5 ms repeated transmission design is shown in FIG. 8. The DCI format X transmission may include a DCI format X subframe for TP0 with a configuration index 0 in subframes 1 and 2 of a radio frame. In addition, the DCI format X transmission may include a DCI format X subframe for TP1 with a configuration index 2 in subframes 6 and 7 of a radio frame.

In some examples, it may be difficult to enable a UL/DL reconfiguration that is too frequent, such as faster than once per 40 ms due to backhaul latency. However, the eNB may configure the UE with a 10 ms duty cycle of common DCI transmission in a four-repeated DCI transmissions pattern within 40 ms period. As a result, the DCI may be transmitted in each radio frame in order to inform the UEs about actual UL-DL configurations, but UL-DL reconfiguration may not change more frequently than a pre-configured period, which can benefit UEs that are in sleep mode and wake up in the middle of the reconfiguration period.

Another example provides functionality 900 of computer circuitry of an evolved node B (eNB) operable to perform a Time Division Duplex (TDD) uplink-downlink (UL-DL) reconfiguration in a heterogeneous network (HetNet). The functionality may be implemented as a method or the functionality may be executed as instructions on a machine, where the instructions are included on at least one computer readable medium or one non-transitory machine readable storage medium. The computer circuitry can be configured to identify cluster metrics for a plurality of evolved node Bs (eNBs) in a cell cluster of the HetNet, wherein the plurality of eNBs in the cell cluster have a backhaul latency within a selected range, as in 910. The computer circuitry can be configured to select a TDD UL-DL configuration index for the plurality of eNBs in the cell cluster based in part on the cluster metrics, as in block 920. The computer circuitry can be further configured to transmit the TDD UL-DL configuration index to one or more user equipments (UEs) located within the cell cluster using a downlink control information (DCI) format, wherein the TDD UL-DL configuration index is transmitted on a Common Search Space (CSS) of a physical downlink control channel (PDCCH) on a UE-specific Primary Cell (PCell), as in block 930.

In one example, the computer circuitry can be further configured to configure downlink control information (DCI) monitoring subframes for the one or more UEs in the cell cluster using radio resource control (RRC) signaling in a UE-specific manner. In one example, the cluster metrics are exchanged between the plurality of eNBs in the cell cluster over an X2 interface, the cluster metrics including one or more of UL-DL configurations being used by eNBs within the cell cluster, DL-UL resources required by each eNB, buffer sizes in UL and DL transmission direction and packet delays.

In one example, the computer circuitry can be further configured to select the TDD UL-DL configuration index for the plurality of eNBs in the cell cluster based on a minimum, mean or maximum of the cluster metrics exchanged between the plurality of eNBs in the cell cluster in a distributed manner. In addition, the computer circuitry can be further configured to select the TDD UL-DL configuration index for the plurality of eNBs in the cell cluster according to a defined periodicity, wherein the defined periodicity is based on the backhaul latency of the plurality of eNBs in the cell cluster and includes 10 milliseconds (ms), 20 ms, 40 ms and 80 ms.

In one configuration, the computer circuitry can be further configured to use a System Frame Number (SFN) counter to control a radio frame having a SFN mod periodicity of zero, wherein the TDD UL-DL configuration index is applied by eNBs in the cell cluster so that the TDD UL-DL configuration is synchronously updated by eNBs within the cell cluster. In addition, the computer circuitry can be further configured to transmit TDD UL-DL configuration index information to the one or more UEs in the cell cluster via a Uu interface, the TDD UL-DL configuration index information being transmitted on a physical downlink control channel (PDCCH) in one or more of subframe numbers 0, 1, 5 or 6 in each radio frame depending on a UE-specific RRC configuration. Furthermore, the computer circuitry can be configured to transmit the TDD UL-DL configuration index to the one or more UEs in the cell cluster according to a predefined periodicity of 10 subframes to 80 subframes and a predefined offset value of 0 subframes to 3 subframes.

In one example, the computer circuitry can be further configured to transmit the TDD UL-DL configuration index to the one or more UEs located in proximity to one or more transmission points (TPs) in a coordinated multi-point (CoMP) scenario 4, wherein the TDD UL-DL configuration index is transmitted to the one or more UEs according to traffic conditions associated with the one or more TPs. In addition, the computer circuitry can be further configured to transmit the TDD UL-DL configuration index to the one or more UEs located in proximity to one or more transmission points (TPs) in a coordinated multi-point (CoMP) scenario 4, wherein the TDD UL-DL configuration index is transmitted to the one or more UEs according to a DL subframes pattern used for downlink channel information (DCI) repeated transmission monitoring.

In one configuration, the computer circuitry can be further configured to transmit the TDD UL-DL configuration index to the one or more UEs in the cell cluster according to an X-bit bitmap indicating a set of system information block type 1 (SIB1) downlink or special (DL/S) subframes, wherein the one or more UEs monitor for a downlink channel information (DCI) transmission from the eNB according to the X-bit bitmap, wherein 'X' represents a number of bits within a bitmap string in which each bit indicates a particular SIB1 DL/S subframes, wherein a bit "1" indicates that the UE shall monitor for a DCI reconfiguration in a corresponding subframe and a bit "0" indicates that the UE shall not monitor for the DCI reconfiguration in the corresponding subframe.

Another example provides functionality 1000 of computer circuitry of a user equipment (UE) operable to implement a Time Division Duplex (TDD) uplink-downlink (UL-DL) reconfiguration in a heterogeneous network (HetNet). The functionality may be implemented as a method or the functionality may be executed as instructions on a machine, where the instructions are included on at least one computer readable medium or one non-transitory machine readable storage medium. The computer circuitry can be configured to indicate a capability of supporting a TDD UL-DL reconfiguration functionality to an evolved node B (eNB) via UE capability reporting, as in block 1010. The computer circuitry can be configured to receive a configuration to enable TDD UL-DL reconfiguration at the UE, as in block 1020.

The computer circuitry can be further configured to receive a TDD UL-DL reconfiguration signal from the eNB in a downlink control information (DCI) message, as in block 1030. In addition, the computer circuitry can be configured to update a TDD UL-DL configuration of the UE based on the TDD UL-DL reconfiguration signal transmitted on a physical downlink control channel (PDCCH) in preconfigured downlink or special (DL/S) subframes by the eNB, as in block 1040.

In one example, the configuration to enable the TDD UL-DL reconfiguration at the UE includes at least one of a UE-specific reconfiguration radio network temporary identifier (RNTI), reconfiguration DCI monitoring subframes configuration information and an indicator index. In addition, the computer circuitry can be further configured to receive the TDD UL-DL reconfiguration signal from the eNB according to a defined periodicity of 10 milliseconds (ms), 20 ms, 40 ms or 80 ms.

In one configuration, the computer circuitry can be further configured to monitor for TDD UL-DL reconfiguration signals received from the eNB in downlink subframes or special subframes according to a system information block type 1 (SIB1). In addition, the computer circuitry can be further configured to monitor for TDD UL-DL reconfiguration signals received from the eNB in more than one subframe between two adjacent periodic instances. Furthermore, a detected TDD UL-DL configuration at the UE is valid for a window having a duration equal to a defined periodicity of the TDD UL-DL reconfiguration signal received from the eNB, the defined periodicity including 10 milliseconds (ms), 20 ms, 40 ms or 80 ms.

In one example, the UE assumes a same TDD UL-DL configuration for two or more TDD UL-DL reconfiguration signals received from the eNB when the two or more TDD UL-DL reconfiguration signals are detected in subframes within a window of a duration equal to a defined periodicity of the TDD UL-DL reconfiguration signals. In addition, the UE includes an antenna, a touch sensitive display screen, a speaker, a microphone, a graphics processor, an application processor, internal memory, or a non-volatile memory port.

Figure 10:
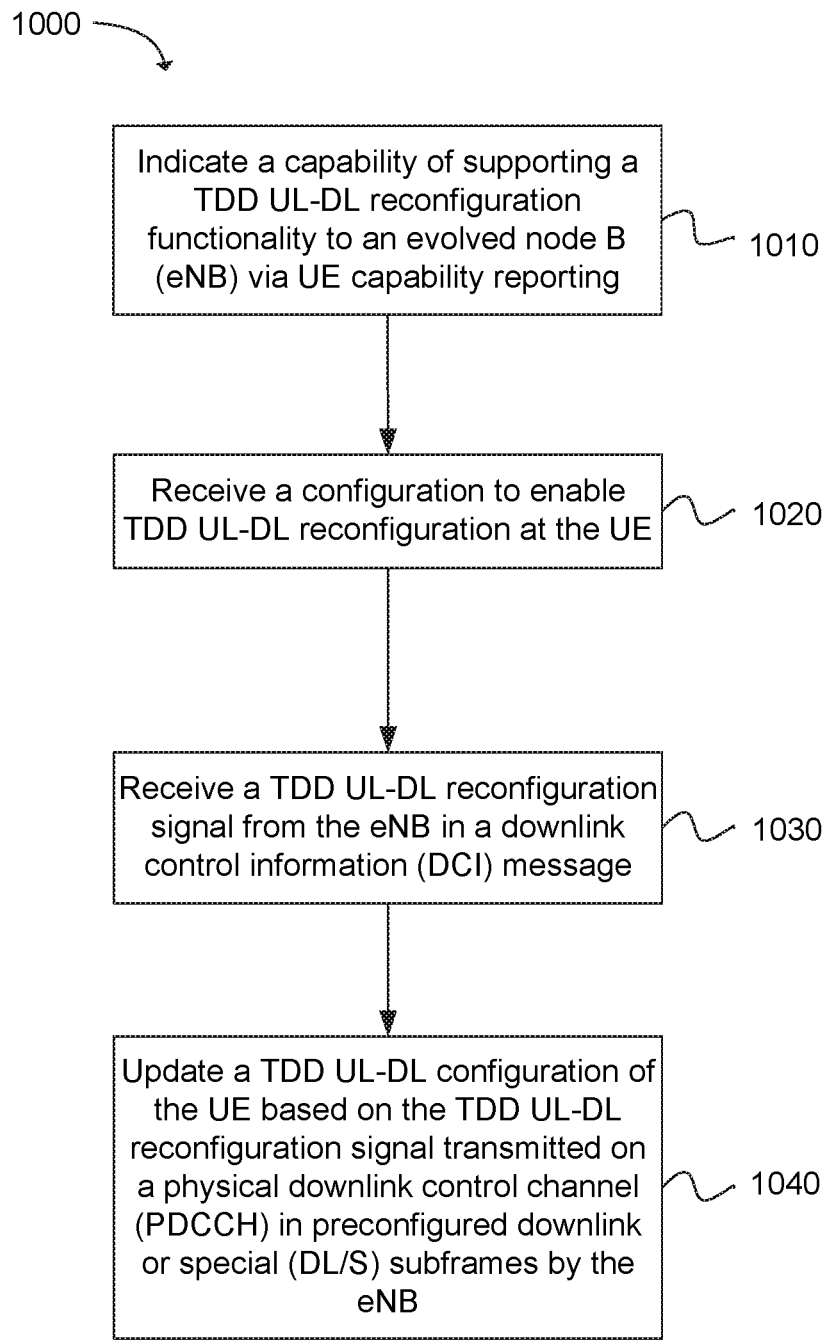
FIG. 10 depicts functionality of computer circuitry of a user equipment (UE) operable to implement a Time Division Duplex (TDD) uplink-downlink (UL-DL) reconfiguration in a heterogeneous network (HetNet) in accordance with an example.
Figure 11:
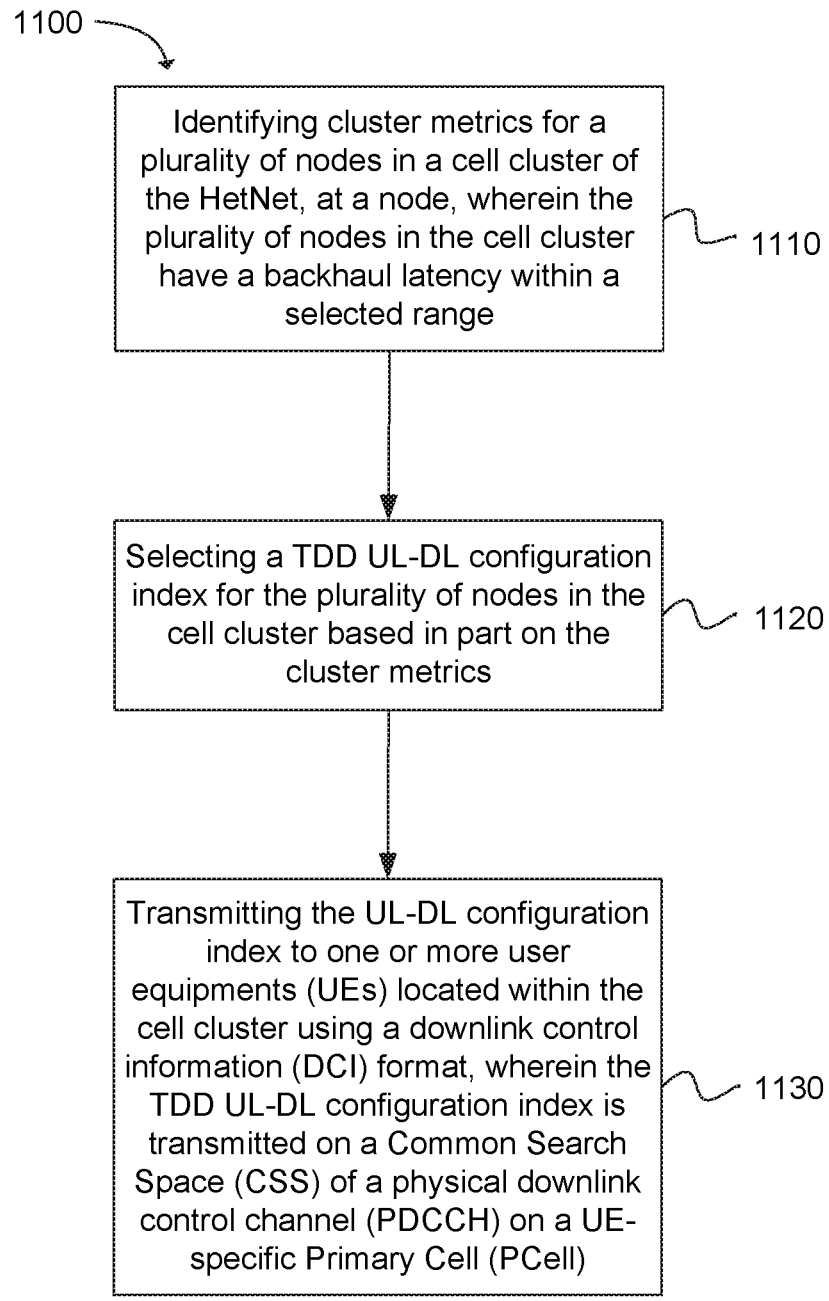
FIG. 11 depicts a flow chart of a method for performing a Time Division Duplex (TDD) uplink-downlink (UL-DL)

Another example provides a method 1100 for performing a Time Division Duplex (TDD) uplink-downlink (UL-DL) reconfiguration in a heterogeneous network (HetNet), as shown in the flow chart in FIG. 10. The method may be executed as instructions on a machine, where the instructions are included on at least one computer readable medium or one non-transitory machine readable storage medium. The method includes the operation of identifying cluster metrics for a plurality of nodes in a cell cluster of the HetNet, at a node, wherein the plurality of nodes in the cell cluster have a backhaul latency within a selected range, as in block 1110. The method can include selecting a TDD UL-DL configuration index for the plurality of nodes in the cell cluster based in part on the cluster metrics, as in block 1120. The method can further include transmitting the UL-DL configuration index to one or more user equipments (UEs) located within the cell cluster using a downlink control information (DCI) format, wherein the TDD UL-DL configuration index is transmitted on a Common Search Space (CSS) of a physical downlink control channel (PDCCH) on a UE-specific Primary Cell (PCell), as in block 1130.

In one configuration, the method can further comprise configuring downlink control information (DCI) monitoring subframes for the one or more UEs in the cell cluster using radio resource control (RRC) signaling, wherein the one or more UEs monitor for the TDD UL-DL reconfiguration in downlink subframes according to a system information block type 1 (SIB1). In addition, the method can further comprise selecting the TDD UL-DL configuration index for the plurality of nodes in the cell cluster based on a minimum, mean or maximum of the cluster metrics, wherein the cluster metrics are exchanged between the plurality of nodes in the cell cluster over an X2 interface, wherein the cluster metrics include one or more of UL-DL configurations, DL-UL resources, buffer sizes in UL and DL and packet delays.

In one configuration, the method can further comprise transmitting the TDD UL-DL configuration index to the one or more UEs in the cell cluster according to an X-bit bitmap indicating a set of system information block type 1 (SIB1) downlink or special (DL/S) subframes, wherein the one or more UEs monitor for a downlink channel information (DCI) transmission from the node according to the X-bit bitmap, wherein 'X' represents a number of bits within a bitmap string in which each bit indicates a particular SIB1 DL/S subframes, wherein a bit "1" indicates that the UE shall monitor for a DCI reconfiguration in a corresponding subframe and a bit "0" indicates that the UE shall not monitor for the DCI reconfiguration in the corresponding subframe. In one example, the node is selected from a group consisting of a base station (BS), a Node B (NB), an evolved Node B (eNB), a baseband unit (BBU), a remote radio head (RRH), a remote radio equipment (RRE), or a remote radio unit (RRU).

Figure 12:
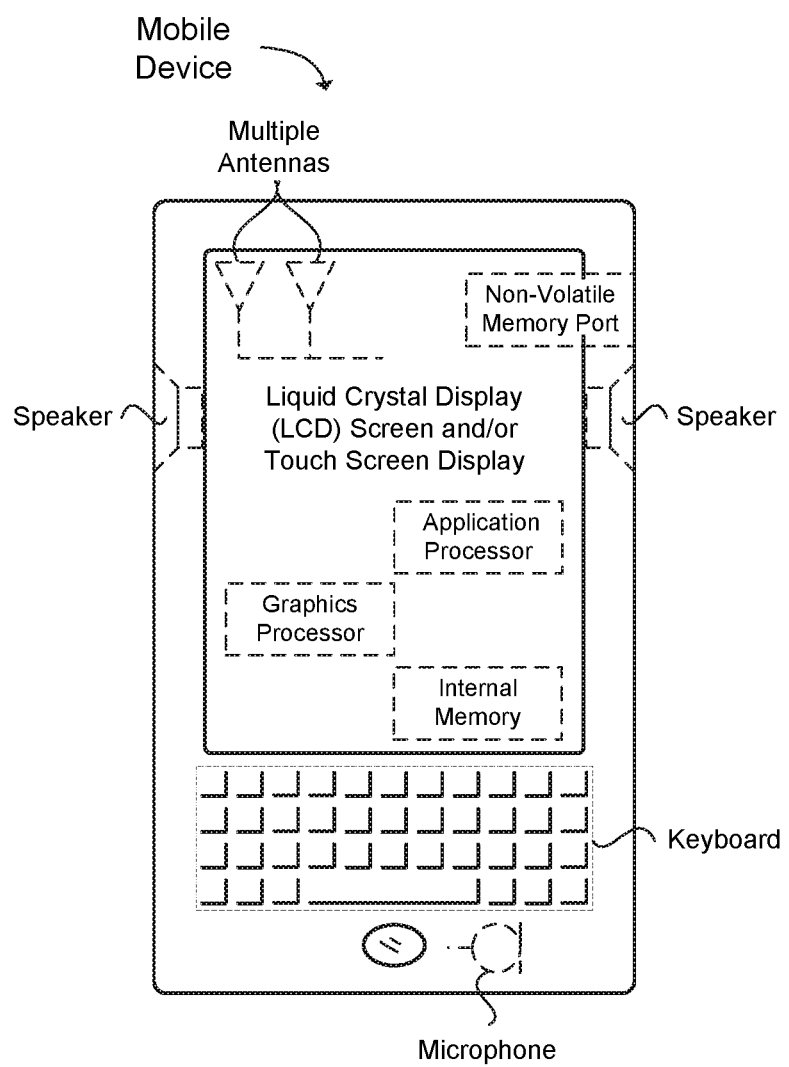
FIG. 12 illustrates a diagram of a wireless device (e.g., UE) in accordance with an example.

FIG. 12 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defecto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An eNodeB operable to perform Enhanced Interference Mitigation & Traffic Adaptation (eIMTA), the eNodeB comprising:
    one or more processors configured to:
    select a radio network temporary identifier (RNTI) that is used for eIMTA;
    determine a periodicity for monitoring a physical downlink control channel (PDCCH) with the RNTI;
    determine a set of subframes to monitor the PDCCH with the RNTI within the periodicity; and
    encode, at the eNodeB for transmission to a user equipment (UE), the RNTI, the periodicity for monitoring the PDCCH with the RNTI, and the set of subframes to monitor the PDCCH with the RNTI; and
    a transceiver configured to transmit to the UE:
    the RNTI;
    the periodicity for monitoring the PDCCH with the RNTI; and
    the set of subframes to monitor the PDCCH with the RNTI.

2. The eNodeB of claim 1, further comprising memory configured to store: the RNTI, the periodicity for monitoring the PDCCH with the RNTI, and the set of subframes to monitor the PDCCH with the RNTI.

3. The eNodeB of claim 1, wherein the one or more processors are further configured to:
    process an UL-DL configuration received from a second eNodeB, wherein the UL-DL configuration is utilized by the second eNodeB; and
    select an UL-DL configuration for eIMTA based on the UL-DL configuration received from the second eNodeB.

4. The eNodeB of claim 1, wherein the set of subframes to monitor the PDCCH with the RNTI is represented using a defined number of bits, wherein a bit value of "1" indicates that the PDCCH with the RNTI on a corresponding subframe is to be monitored by the UE, and a bit value of "0" indicates that the PDCCH with the RNTI on a corresponding subframe is to not be monitored by the UE.

5. The eNodeB of claim 1, wherein the set of subframes to monitor the PDCCH with the RNTI includes downlink subframes indicated by an UL-DL configuration in a system information block 1 (SIB1).

6. The eNodeB of claim 5, wherein the downlink subframes indicated by the UL-DL configuration in the SIB1 is for time division duplexing (TDD).

7. The eNodeB of claim 1, wherein the periodicity for monitoring the PDCCH with the RNTI is one of: 10 milliseconds (ms), 20 ms, 40 ms or 80 ms.

8. A user equipment (UE) operable perform Enhanced Interference Mitigation & Traffic Adaptation (eIMTA), the UE comprising:
    one or more processors configured to:
    process an eIMTA configuration received from an eNodeB, wherein the eIMTA configuration includes:
        a radio network temporary identifier (RNTI) that is used for eIMTA;
        a periodicity for monitoring a physical downlink control channel (PDCCH) with the RNTI; and
        a set of subframes to monitor the PDCCH with the RNTI; and
    monitor the PDCCH with the RNTI in the set of subframes indicated in the eIMTA configuration; and
    a transceiver configured to receive the eIMTA configuration from the eNodeB.

9. The UE of claim 8, further comprising memory configured to store the eIMTA configuration from the eNodeB.

10. The UE of claim 8, wherein the set of subframes to monitor the PDCCH with the RNTI is represented using a defined number of bits, wherein a bit value of "1" indicates that the PDDCH with the RNTI on a corresponding subframe is to be monitored by the UE, and a bit value of "0" indicates that the PDCCH with the RNTI on a corresponding subframe is to not be monitored by the UE.

11. The UE of claim 8, wherein the set of subframes to monitor the PDCCH with the RNTI includes downlink subframes indicated by an UL-DL configuration in a system information block 1 (SIB1), and the downlink subframes indicated by the UL-DL configuration in the SIB1 is for time division duplexing (TDD).

12. The UE of claim 8, wherein the periodicity for monitoring the PDCCH with the RNTI is one of: 10 milliseconds (ms), 20 ms, 40 ms or 80 ms.

13. The UE of claim 8, wherein the UE includes at least one of: an antenna, a display screen, a speaker, a microphone, a graphics processor, an application processor, an internal memory, or a non-volatile memory port.

14. At least one non-transitory machine readable storage medium having instructions embodied thereon, the instructions when executed by one or more processors perform the following:

selecting, at an eNodeB, a radio network temporary identifier (RNTI) that is used for Enhanced Interference Mitigation & Traffic Adaptation (eIMTA);

determining, at the eNodeB, a periodicity for monitoring a physical downlink control channel (PDCCH) with the RNTI;

determining, at the eNodeB, a set of subframes to monitor the PDCCH with the RNTI within the periodicity; and encoding, at the eNodeB for transmission to a user equipment (UE), the RNTI, the periodicity for monitoring the PDCCH with the RNTI, and the set of subframes to monitor the PDCCH with the RNTI.

15. The at least one non-transitory machine readable storage medium of claim 14, further comprising instructions when executed perform the following:

processing an UL-DL configuration received from a second eNodeB, wherein the UL-DL configuration is utilized by the second eNodeB; and selecting an UL-DL configuration for eIMTA based on the UL-DL configuration received from the second eNodeB.

16. The at least one non-transitory machine readable storage medium of claim 14, wherein the set of subframes to monitor the PDCCH with the RNTI is represented using a defined number of bits, wherein a bit value of "1" indicates that the PDCCH with the RNTI on a corresponding subframe is to be monitored by the UE, and a bit value of "0" indicates that the PDCCH with the RNTI on a corresponding subframe is to not be monitored by the UE.

17. The at least one non-transitory machine readable storage medium of claim 14, wherein the set of subframes to monitor the PDCCH with the RNTI includes downlink subframes indicated by an UL-DL configuration in a system information block 1 (SIB1), and the downlink subframes indicated by the UL-DL configuration in the SIB1 is for time division duplexing (TDD).

18. The at least one non-transitory machine readable storage medium of claim 14, wherein the periodicity for monitoring the PDCCH with the RNTI is one of: 10 milliseconds (ms), 20 ms, 40 ms or 80 ms.

19. At least one non-transitory machine readable storage medium having instructions embodied thereon, the instructions when executed by one or more processors perform the following:

processing, at a user equipment (UE), an Enhanced Interference Mitigation & Traffic Adaptation (eIMTA) configuration received from an eNodeB, wherein the eIMTA configuration includes:

a radio network temporary identifier (RNTI) that is used for eIMTA;

a periodicity for monitoring a physical downlink control channel (PDCCH) with the RNTI; and a set of subframes to monitor the PDCCH with the RNTI; and monitoring, at the UE, the PDCCH with the RNTI in the set of subframes indicated in the eIMTA configuration.

20. The at least one non-transitory machine readable storage medium of claim 19, wherein the set of subframes to monitor the PDCCH with the RNTI is represented using a defined number of bits, wherein a bit value of "1" indicates that the PDDCH with the RNTI on a corresponding subframe is to be monitored by the UE, and a bit value of "0" indicates that the PDCCH with the RNTI on a corresponding subframe is to not be monitored by the UE.

21. The at least one non-transitory machine readable storage medium of claim 19, wherein the set of subframes to monitor the PDCCH with the RNTI includes downlink subframes indicated by an UL-DL configuration in a system information block 1 (SIB1), and the downlink subframes indicated by the UL-DL configuration in the SIB1 is for time division duplexing (TDD).

22. The at least one non-transitory machine readable storage medium of claim 19, wherein the periodicity for monitoring the PDCCH the RNTI is one of: 10 milliseconds (ms), 20 ms, 40 ms or 80 ms.

* * * * *